(12) United States Patent
Neet et al.

(10) Patent No.: US 7,687,954 B2
(45) Date of Patent: Mar. 30, 2010

(54) BRUSHLESS ELECTRIC MACHINE WITH STATOR WITH CASCADED END LOOPS

(75) Inventors: Kirk Neet, Pendleton, IN (US); Michael T. York, Pendleton, IN (US); Michael Bradfield, Anderson, IN (US)

(73) Assignee: Remy Technologies, L.L.C., Anderson, IN (US)

( * ) Notice: Subject to any disclaimer, the term of this patent is extended or adjusted under 35 U.S.C. 154(b) by 213 days.

(21) Appl. No.: 11/511,789

(22) Filed: Aug. 29, 2006

(65) Prior Publication Data

US 2007/0228898 A1 Oct. 4, 2007

Related U.S. Application Data

(63) Continuation-in-part of application No. 11/394,258, filed on Mar. 30, 2006.

(51) Int. Cl.
*H02K 19/00* (2006.01)
(52) U.S. Cl. .................................. 310/91; 310/263
(58) Field of Classification Search ................ 310/263, 310/58–59, 201, 208, 91, 261.1
See application file for complete search history.

(56) References Cited

U.S. PATENT DOCUMENTS

| | | | | |
|---|---|---|---|---|
| 3,602,747 A | * | 8/1971 | Stroppa et al. | 310/68 D |
| 3,749,954 A | * | 7/1973 | Anderson, Jr. | 310/90 |
| 3,953,753 A | * | 4/1976 | Barrett | 310/168 |
| 4,221,982 A | * | 9/1980 | Raver et al. | 310/59 |
| 4,418,295 A | * | 11/1983 | Shiga | 310/59 |
| 4,611,139 A | * | 9/1986 | Godkin et al. | 310/266 |
| 4,701,653 A | * | 10/1987 | Merkle et al. | 310/152 |
| 4,980,587 A | * | 12/1990 | Yonei et al. | 310/67 R |
| 5,083,077 A | | 1/1992 | Wallace et al. | 322/32 |
| 5,705,865 A | * | 1/1998 | Ishida et al. | 310/62 |
| 5,796,190 A | * | 8/1998 | Takeda et al. | 310/58 |
| 6,166,461 A | * | 12/2000 | Kusase et al. | 310/58 |
| 6,882,077 B2 | * | 4/2005 | Neet | 310/208 |
| 6,967,423 B2 | | 11/2005 | Kuroda et al. | 310/194 |
| 2005/0006979 A1 | | 1/2005 | Neet | 310/270 |
| 2007/0096589 A1 | * | 5/2007 | York | 310/263 |

FOREIGN PATENT DOCUMENTS

| | | | | |
|---|---|---|---|---|
| FR | 91198 | * | 4/1968 | 310/263 |
| JP | 55074336 A | * | 6/1980 | |
| JP | 01318532 A | * | 12/1989 | |

* cited by examiner

*Primary Examiner*—Tran N Nguyen
(74) *Attorney, Agent, or Firm*—Cantor Colburn LLP

(57) ABSTRACT

Disclosed herein is a brushless electric machine comprising, a housing, a stationary field coil, a shaft, a bearing, a pole segment, and a stator. The stator including a core having a plurality of core slots that extend between a first and a second end of the stator core. The stator also including a winding with a plurality of phases, each of the phases having at least one conductor having a plurality of substantially straight segments disposed in the core slots. The straight segments are alternately connected at the first and the second ends of the stator core by a plurality of end loop segments. A section of at least one of the conductors including three consecutive end loop segments and two straight segments, is formed from a single continuous conductor, and one of the core slots houses a plurality of the straight segments arranged in at least one radial row.

11 Claims, 10 Drawing Sheets

US 7,687,954 B2

BRUSHLESS ELECTRIC MACHINE WITH STATOR WITH CASCADED END LOOPS

CROSS REFERENCE TO RELATED APPLICATIONS

This application is a continuation-in-part application of U.S. patent application Ser. No. 11/394,258 filed Mar. 30, 2006 the entire contents of which are incorporated herein by reference.

BACKGROUND OF THE INVENTION

Brushless electric machines for generating electricity are found in many motor vehicles today. These electric machines, also referred to as alternators, produce electricity necessary to power vehicle accessories, as well as to charge a vehicle's battery. Electric machines must also provide the capability to produce electricity in sufficient quantities to power a vehicle's electrical system in a manner that is compatible with the vehicle electrical components. Furthermore, electrical loads for vehicles continue to escalate while, at the same time, the overall package size available for the electrical machine continues to shrink.

Conventional brushless electric machine components lack a sufficient magnetic circuit to achieve higher power densities and require expensive drive end bearings due to their support system. In addition, they do not have internal cooling needed to supply electricity at these higher demands and therefore have larger package sizes.

Accordingly, there is a need for brushless electric machines with high power density.

BRIEF SUMMARY OF THE INVENTION

Disclosed herein is an apparatus that relates to a brushless vehicle alternator. The alternator comprising, a housing, a stationary field coil, a shaft, a bearing, a pole segment rotatable relative to the housing, and a stator surrounding the pole segment. The stator including a core having a plurality of core slots in a surface thereof, and the core slots extend between a first and a second end of the stator core. A stator winding including a plurality of phases, with each of the phases having at least one conductor having a plurality of substantially straight segments disposed in the core slots. The straight segments are alternately connected at the first and the second ends of the stator core by a plurality of end loop segments. A section of at least one of the conductors including three consecutive end loop segments and two straight segments, is formed from a single continuous conductor, and one of the core slots houses a plurality of the straight segments arranged in at least one radial row.

Further disclosed herein is an apparatus that relates to a brushless electric machine. The electric machine comprising, a housing, a stationary field coil, a shaft, a bearing, a pole segment, and a stator surrounding the pole segment. The stator comprising, a generally cylindrically-shaped stator core having a plurality of circumferentially spaced and axially-extending core slots in a surface thereof, the core slots extending between a first and a second end of the stator core. The stator further comprising a winding including a plurality of phases, each of the phases having at least one conductor having a plurality of substantially straight segments disposed in the core slots. The straight segments, of the winding, alternately connected at the first and second ends of the stator core by a plurality of end loop segments, and a section of at least one of the conductors having three consecutive straight segments wherein each of the three consecutive straight segments are disposed in the same radial position.

Further disclosed herein is an apparatus that relates to another brushless electric machine. The machine comprising, a housing, a stationary field coil, a shaft, a bearing, a pole segment rotatable relative to the housing, and a stator surrounding the pole segment. The stator comprising, a generally cylindrically-shaped stator core having a plurality of circumferentially spaced and axially-extending core slots in a surface thereof. The stator core slots extending between a first and a second end of said stator core. The stator having a winding including a section with at least one layer of conductors having a plurality of phases, the section including at least three consecutive end loop segments and at least two consecutive straight segments. Each of the phases having a plurality of substantially straight segments disposed in said core slots, and said straight segments alternately connected at said first and second ends of said stator core by a plurality of end loop segments. The three consecutive straight segments each being in a substantial same radial distance from a central axis of said stator core. Additionally, each of the three consecutive end loop segments includes a first sloped portion substantially co-radial with said at least one layer and a second sloped portion substantially non-co-radial with said at least one layer. The first and second sloped portions being connected by an apex portion thereof, wherein one of said first sloped portion, said second sloped portion, and said apex portion of each of said end loop segments includes a radial outward adjustment. Additionally, one of said first sloped portion, said second sloped portion, and said apex portion of each of said end loop segments includes a radial inward adjustment.

BRIEF DESCRIPTION OF THE DRAWINGS

Referring to the drawings wherein like elements are numbered alike in the several Figures.

DETAILED DESCRIPTION OF THE INVENTION

Figure 1:
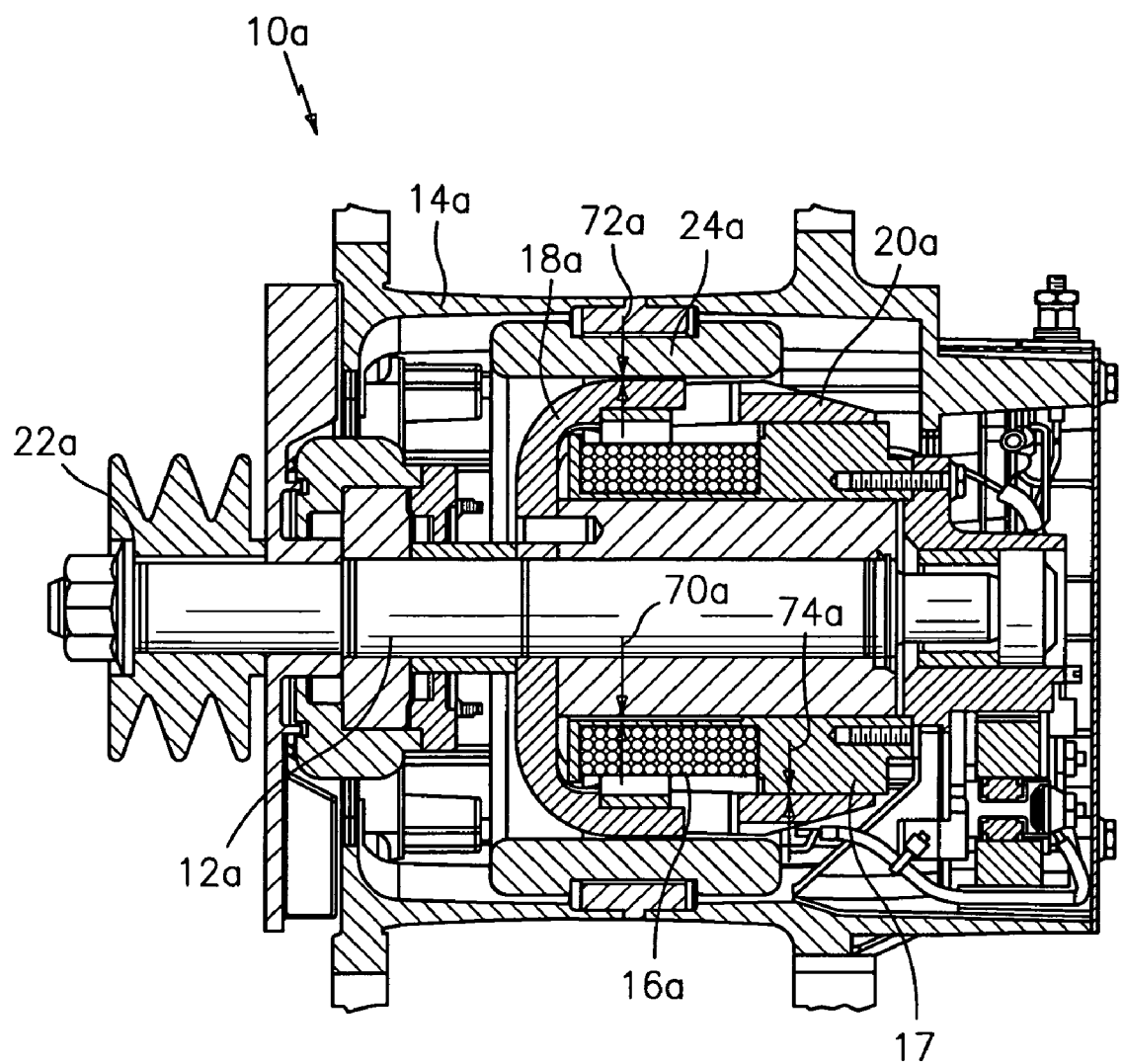
FIG. 1 depicts a cross section view of a brushless electric machine disclosed herein.

FIG. 1 illustrates a cross-section view of a brushless electric machine 10a. The brushless electric machine 10a includes a rotatable shaft 12a supported within a housing 14a. A field coil 16a is wound over a spool 17 that is attached to the housing 14a and a first pole segment 18a rotatable with the shaft 12a, and a second pole segment 20a (also rotatable with the shaft 12a) cantilevered from the first pole segment 18a. Additionally, a pulley 22a is attached to a portion of the shaft 12a projecting through the housing 14a. A stator 24a, attached to the housing 14a, surrounds the pole segments 18a and 20a. The stator 24a will be described in great detail with reference to FIGS. 5-13.

Figures 2, 3:
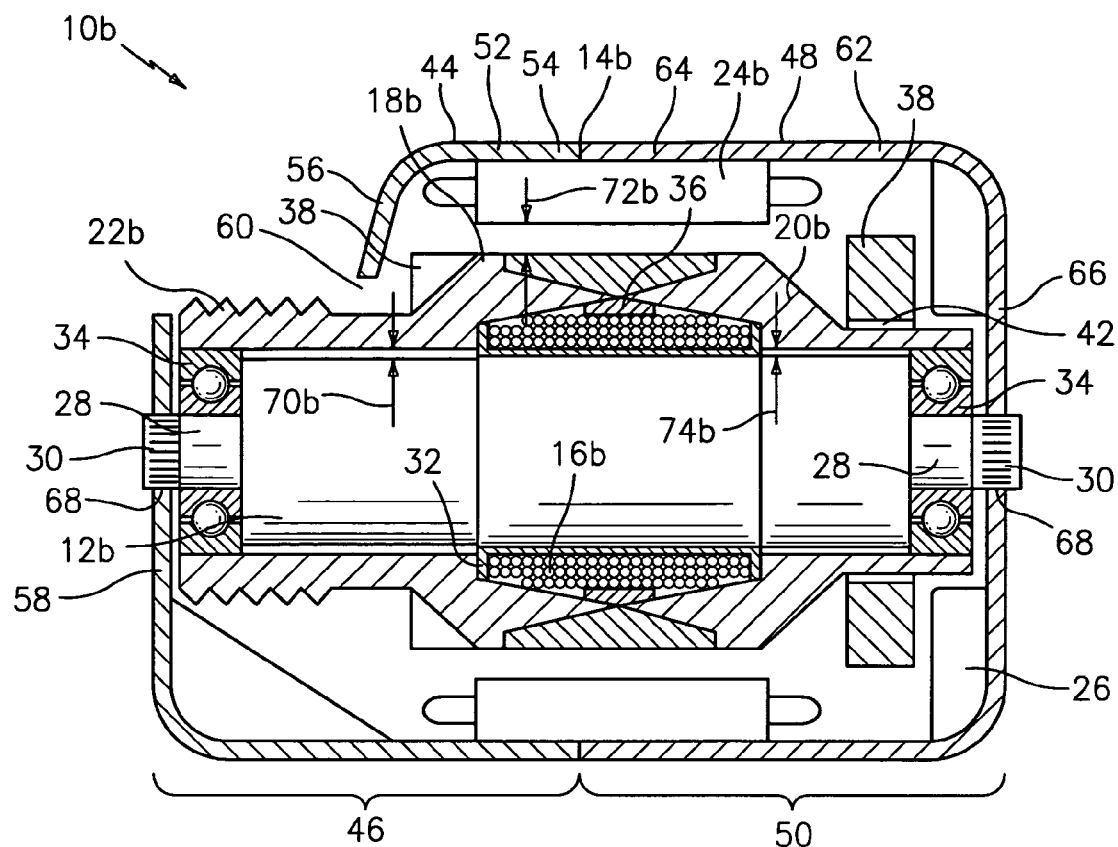
FIG. 2 depicts a cross section view of an alternate brushless electric machine disclosed herein.
FIG. 3 depicts a front plan view of the brushless electric machine illustrated in FIG. 2.

Referring to FIGS. 2 and 3, an exemplary embodiment of a brushless electric machine 10b that, for example, in one embodiment can be used as an automobile alternator, is illustrated. The brushless electric machine 10b includes a stationary shaft 12b mounted inside a housing 14b. A field coil 16b is fixed to the shaft 12b, and a first pole segment 18b and a second pole segment 20b surround the field coil 16b and are rotatable about the stationary shaft 12b. A pulley 22b transmits rotational torque to the pole segments 18b and 20b. A stator 24b is attached to the housing 14b and surrounds the pole segments 18b and 20b. A rectifier 26 converts alternating current generated in the stator 24b into direct current. The stator 24b will be described in great detail with reference to FIGS. 5-13.

The stationary shaft 12b has a common diameter substantially throughout the axial length of the shaft 12b and includes reduced diameter portions 28 at each end of the shaft 12b. Although FIG. 2 shows the shaft 12b having a common diameter, it should be noted that the diameter may vary at different axial points along the axial length of the shaft 12b. The reduced diameter portions 28, in one embodiment (and as illustrated) further include knurled ends 30, which are received by the housing 14b in a press-fit configuration. It is to be understood however that the knurls are not required. One alternative configuration does not exhibit knurls at all but merely will have an outside diameter sufficient to cause an interference engagement with the housing 14b. A second alternative configuration has a press-fit engagement to the housing 14b on one end of the shaft 12b and a slip fit engagement to the housing 14b on the other end of the shaft 12b. Shaft 12b may also be fastened to the housing 14b, for example by welding, so that tight tolerances for an interference fit may be relaxed. The shaft 12b is a stationary component, not intended to rotate with the pulley 22b, and provides a mounting surface to which a bobbin spool 32 attaches. The field coil 16b is wound upon the bobbin spool 32 and generates, when energized, a magnetic flux that saturates the pole segments 18b and 20b and the shaft 12b. Attaching the bobbin spool 32 and field coil 16b to the shaft 12b, which is press-fitted at one or both ends to the housing 14b provides for a robust support structure.

Figure 4:
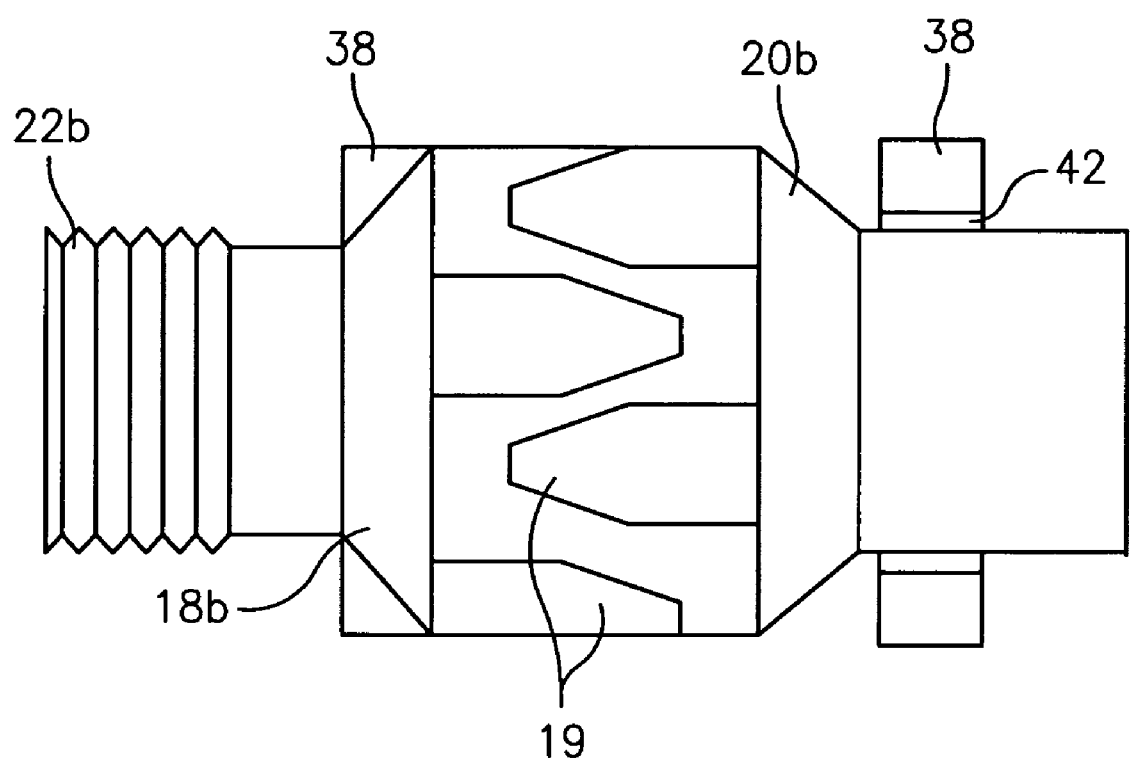
FIG. 4 depicts a front plan view of a rotor only portion of the brushless electric machine illustrated in FIG. 2.

The shaft 12b also supports a pair of bearings 34 attached at the reduced diameter portions 28 of the shaft 12b adjacent to the knurled ends 30. The bearings 34 in turn rotatably support the pole segments 18b and 20b thereby allowing the pole segments 18b and 20b to rotate about the shaft 12b. The first pole segment 18b and the second pole segment 20b are attached to each other by way of a ring 36 that may be welded or press-fitted between the two pole segments 18b and 20b. The pole segments 18b and 20b may be, for example, in one embodiment, claw pole segments each having a plurality of claw-shaped fingers 19 extending from the outer periphery of each of the pole segments 18b and 20b as illustrated in FIG. 4. The ring 36 is fabricated from a non-ferromagnetic material to prevent leakage flux between the pole segments 18b and 20b. Attachment of the pole segments 18b and 20b allows for rotation of the second pole segment 20b when a rotational torque is applied to the first pole segment 18b. Rotational torque, from an engine for example, is transmitted to first pole segment 18b by means of a belt (not shown) wrapped around the outer periphery of the pulley 22b which may be attached to, by a press fit for example, or integral with (as shown in FIGS. 2 and 4), the first pole segment 18b. The bearing 34 supporting the first pole segment 18b is disposed within an inside diameter of the pulley 22b, thus resulting in long life and low wear of the bearing 34.

A pair of fans 38 are attached to the pole segments 18b and 20b to circulate cooling air within the electric machine 10b. The fans 38 draw air into the electric machine 10b from an axial direction through a plurality of cooling slots 40 (illustrated in FIG. 3) within the housing 14b and exhaust air out in a radial direction inside the housing 14b. The fans 38 may be integral with or attached to the pole segments 18b and 20b. One method of attaching the fan 38 to the pole segment 18b and/or 20b may include an insert ring 42 disposed between the fan 38 and the pole segment 18b or 20b to provide for a press-fit therebetween.

The housing 14b comprises a first half 44 surrounding a pulley end 46 of the electric machine 10b and a second half 48 surrounding a rectifier end 50 of the machine 10b. The first half 44 of the housing 14b has a body portion 52 having a cylindrical shape, wherein the body portion 52 has an open end 54 and a partially closed end 56, cantilevered from a tongue shaped support member portion 58. An opening 60 in the partially closed end 56 has a diameter capable of allowing the pulley 22b to project through the partially closed end 56 for proper orientation with respect to the belt (not shown). The cylindrical body portion 52 is offset from the support member portion 58 in the axial direction to allow for engagement of the belt with the pulley 22b. The second half 48 of the housing 14b also has a body portion 62 having a cylindrical shape which includes an open end 64 and a closed end 66. The first half 44 and second half 48 of the housing 14b are attached together at their respective open ends 54 and 64 to form the housing 14b. Additionally, the support member portion 58 and the closed end 66 each have a small opening 68, along the cylindrical body portion 52 and 62 central axis, having a close tolerance diametral dimension for receiving the knurled portion of the shaft 12b in a press-fit configuration.

During operation of the electric machine 10b, magnetic flux first flows from the field coil 16b to the shaft 12b. Next, the magnetic flux flows from the shaft 12b to the adjacent first pole segment 18b through an air gap 70b defined therebetween. Then, the magnetic flux flows from the first pole segment 18b to the stator 24b through an air gap 72b defined therebetween. Further, the magnetic flux flows from the stator 24b to the second pole segment 20b through the air gap 72b. Yet further, the magnetic flux flows from the second pole segment 20b to the shaft 12b through an air gap 74b defined therebetween.

Significant advantages in power densities may be attained by reducing the magnetic reluctance of the air gaps 70b, 72b, and 74b in a magnetic circuit. Reluctance is governed by the equation R=L/uA, where R is reluctance, L is the air gap length, u is a constant, and A is the face area of the air gap. Referring to FIG. 2, the air gaps in the above formula are illustrated as numerals 70b, 72b, and 74b. Wherein air gap 70b is the radial distance between the shaft 12b and the first pole segment 18b, air gap 72b is the radial distance between the pole segments 18b and 20b and the stator 24b, and air gap 74b is the radial distance between the second pole segment 20b and the shaft 12b. The air gap length (L) in the reluctance formula (R=L/uA) will be understood to be the radial distances between the corresponding components discussed above. While the face area (A) of the air gap is defined by the component surfaces adjacent to the air gap (i.e. the outer surface of the shaft 12b and the inner surface of the pole segments 18b and 20b for air gaps 70b and 74b, and the outer surfaces of the pole segments 18b and 20b and inner surface of the stator 24b for air gap 72b). The geometry of the electric machine 10b, having a pair of pole segments 18b and 20b rotatable about the long stationary shaft 12b, provides for large face areas (A) of the air gaps 70b and 72b between the shaft 12b and pole segments 18b and 20b that provide many times higher face area of the air gap over machine configurations having a first pole segment attached to a rotating shaft and a second pole segment cantilevered from the first pole segment, thus resulting in relatively small face areas (A) of the air gaps (illustrated as air gaps 70a, 72a, and 74a in FIG. 1). Due to the robust support structure of the stationary shaft 12b and pole segments 18b and 20b within the electric machine 10b, smaller nominal clearances between rotating and stationary components are achievable, thus allowing for reduced air gap lengths. The air gap length 70b and 72b can be greatly reduced since each pole segment 18b or 20b is supported by a bearing 34 on one end and the opposing pole segment 18b or 20b via the ring 36 on the other end, thus eliminating the cantilevered pole configuration used in the embodiment of FIG. 1. Further, the second pole segment 20b is better supported, as described above, than the brushless pole segments of FIG. 1 thus allowing for reduced length of the air gap 72b. The stability in the rotor improves the high speed capability of the electric machine 10b by reducing the deflection of the pole segments 18b and 20b caused by centrifugal force during rotation of the electric machine 10b. The reduction in magnetic reluctance leads to improved power output in a smaller package size, and therefore reducing the overall weight of the electric machine 10b. In addition, the internal cooling fans 38 contained within the housing 14b further enable a small overall package size of the electric machine 10b. Another design parameter that can affect the power density of the electric machines 10a and 10b is the packing efficiency of the stators 24a and 24b. Embodiments of the construction of such high packing efficiency stators 24a and 24b will now be described in detail.

Figure 5:
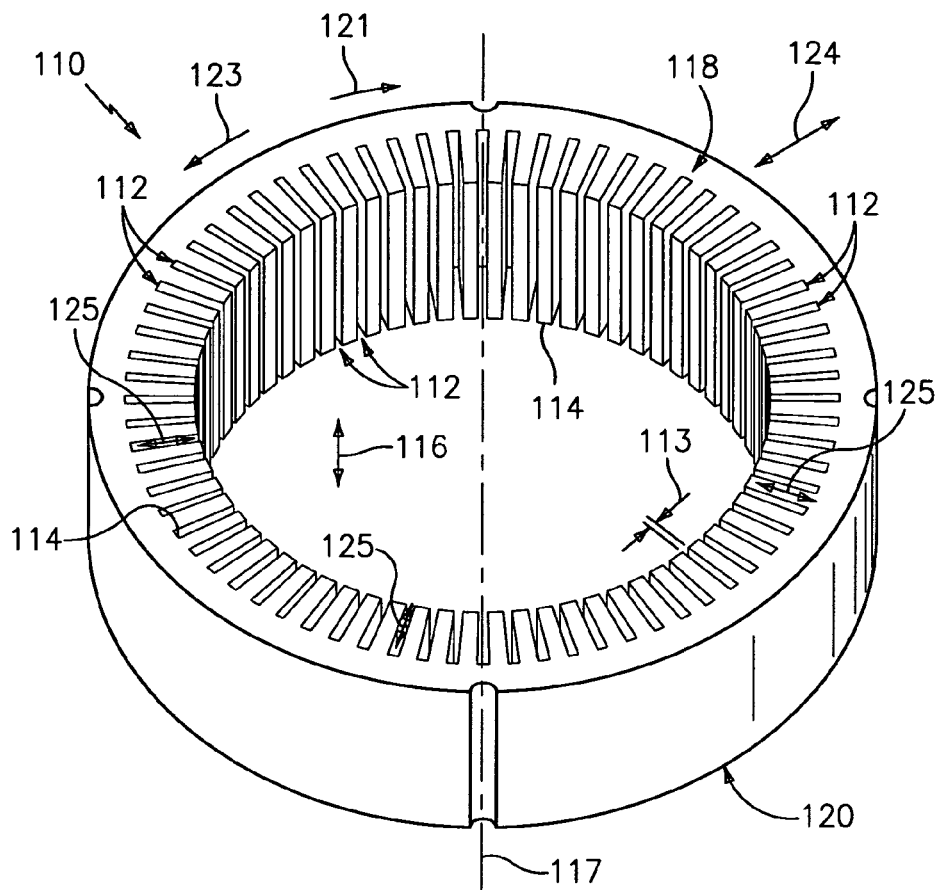
FIG. 5 depicts a perspective view of a stator core disclosed herein.

Referring now to FIG. 5, a generally cylindrically shaped stator core is indicated generally at 110. The stator core 110 includes a plurality of core slots 112 formed in a circumferential interior surface 114 thereof. The core slots 112 extend in a direction, indicated by an arrow 116, parallel to the central axis 117 of the stator core 110 between a first end 118 and a second end 120 thereof. An axially upward direction is defined as moving toward the first end 118 of the stator core 110 and an axially downward direction is defined as moving toward the second end 120 of the stator core 110. Preferably, the core slots 112 are equally spaced around the circumferential inner surface 114 of the stator core 110 and the respective inner surfaces 114 of the core slots 112 are substantially parallel to the central axis 117. A circumferential clockwise direction is indicated by an arrow 121 and a circumferential counterclockwise direction is indicated by an arrow 123. The core slots 112 define a depth 125 along a radial axis, indicated by an arrow 124, and are adapted to receive a stator winding, discussed in more detail below. A radial inward direction is defined as moving towards the central axis 117 of the stator core 110 and a radial outward direction is defined as moving away from the central axis 117.

Figure 6:
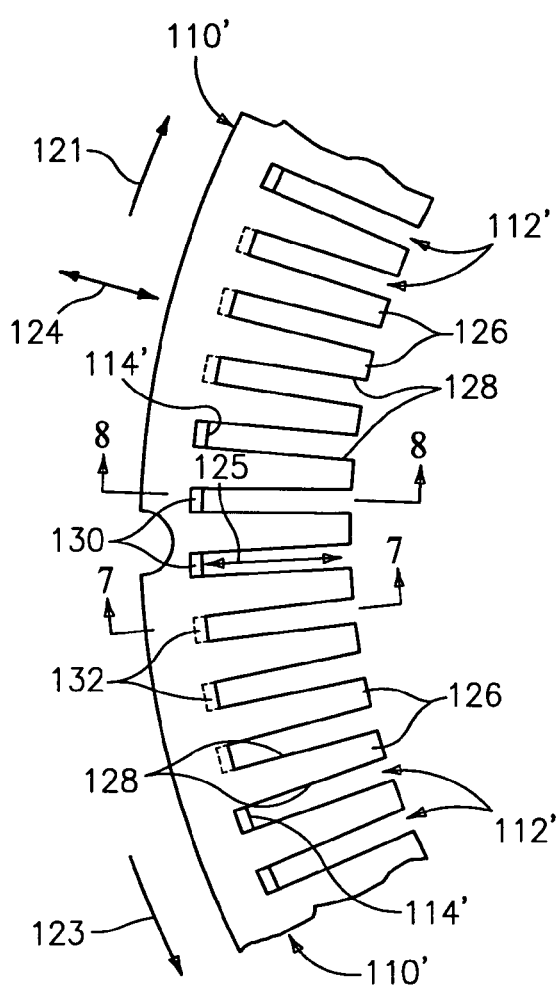
FIG. 6 depicts a fragmentary top/plan view of a stator core disclosed herein.
Figure 7:
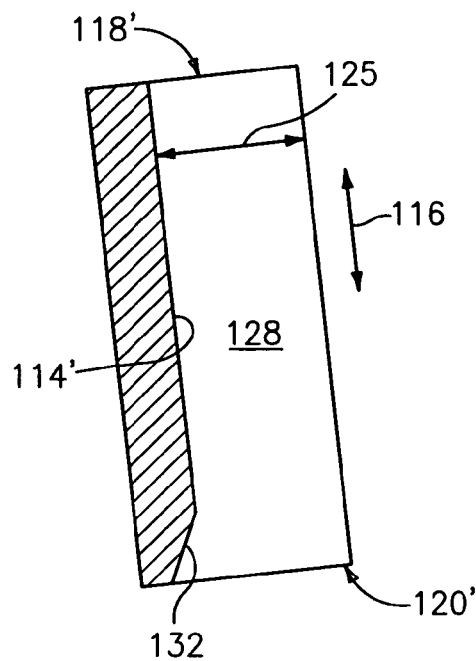
FIG. 7 depicts a cross sectional view taken along the line 7-7 in FIG. 6.
Figure 8:
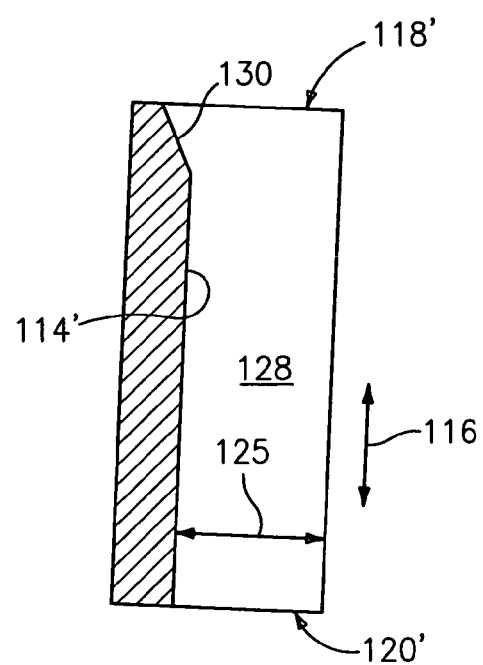
FIG. 8 depicts a cross sectional view taken along the line 8-8 in FIG. 6.

There is shown in FIGS. 6-8, a fragmentary view of an alternative embodiment of a stator core, indicated generally at 110'. The stator core 110' includes a plurality of core slots 112' formed in an interior surface 114' thereof. The core slots 112' define a plurality of teeth 126 between a respective interior surface 128 thereof and extend between a first end 118' and a second end 120' of the stator core 110'. A predetermined number of consecutive core slots 112' include an angled surface 130 adjacent the first end 118' of the stator core 110'. The same predetermined number of the next consecutive core slots 112' include an angled surface 132 adjacent the second end 120' of the stator core 110'. The predetermined number of consecutive core slots 112' equals the number of phases of the stator winding, discussed in more detail below. In FIGS. 6-8, the predetermined number is three because the stator core 110' is adapted to receive a three phase alternator stator winding 186 shown in FIGS. 10 and 11. The alternating pattern of angled surfaces, therefore, repeats for every three consecutive core slots 112' and repeats throughout the circumference 114 of the stator core 110'. For a six phase alternator stator winding (not shown), the predetermined number would be six and the alternating pattern would be repeated for every six consecutive slots 112' throughout the circumference 114 of the stator core 110'.

Figure 9:
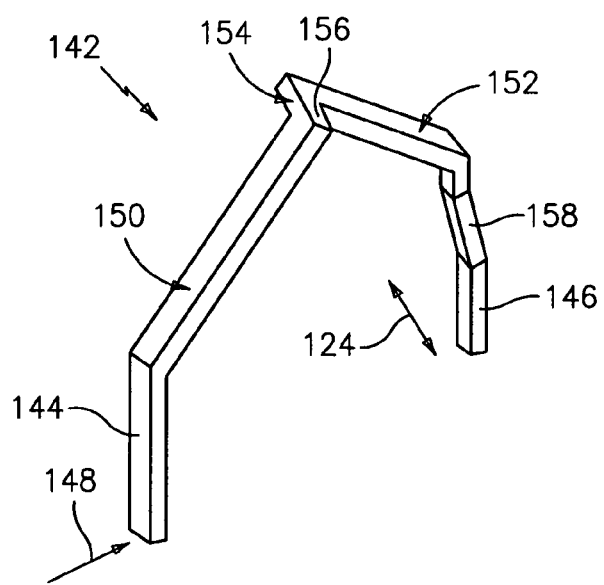
FIG. 9 depicts a fragmentary perspective view of an end loop segment of a stator winding disclosed herein.

Referring now to FIG. 9, an end loop segment is indicated generally at 142. The end loop segment 142 is adapted to be a part of the stator winding 186 and includes a first substantially straight end portion 144 and a second substantially straight end portion 146 that are each proximate to a respective straight segment, discussed in more detail below, of the stator winding 186. The first end portion 144 and the second end portion 146 of the end loop segment 142 are at a same substantial radial distance from the central axis 117 of the stator core 110 or 110' and therefore will be in the same radial position. The straight segments (not shown) connected to the end portions 144 and 146 will therefore also be at substantially the same radial distance from the central axis of the core and therefore be housed in the same radial position. The radial position is determined to be the position of the straight segment with respect to the other straight segments in a core slot, for example, in one core slot, the outermost straight portion is considered to be housed in the outermost radial position, the second outermost straight portion is considered to be housed in the second outermost radial position and so forth. The radial position of a straight segment is a relative position and not a distance. The first end portion 144 and the second end portion 146 form a portion of a layer, indicated generally at 148, of the stator winding 186 whose straight segments are in a same radial distance (and radial position) from the central axis 117 of the stator core 110 or 110'.

The end loop segment 142 includes a first sloped portion 150 and a second sloped portion 152 that meet at an apex portion 154. The first sloped portion 150 is substantially co-radial with the layer 148, the first end portion 144 and the second end portion 146. The second sloped portion 152 is substantially non-co-radial with the layer 148, the first end portion 144 and the second end portion 146. The apex portion 154 includes a first radial extension portion 156. The first radial extension portion 156 extends from the first sloped portion 150 in the radially outward direction, which provides a radial outward adjustment for the end loop segment 142. A second sloping radial extension portion 158 connects the second sloped portion 152 and the second end portion 146. The second radial extension portion 158 extends from the second sloped portion 152 in the radially inward direction, which provides a radial inward adjustment for the end loop segment 142. While the end loop segment 142 has been shown wherein the radial outward adjustment is adjacent the apex portion 154 and the radial inward adjustment is adjacent the second sloped portion 152, those skilled in the art can appreciate that the radial outward and inward adjustments can be on any one or on any two of the first sloped portion 150, the second sloped portion 152, and the apex portion 154 in order to provide the cascaded winding pattern, described in more detail below.

Figure 10:
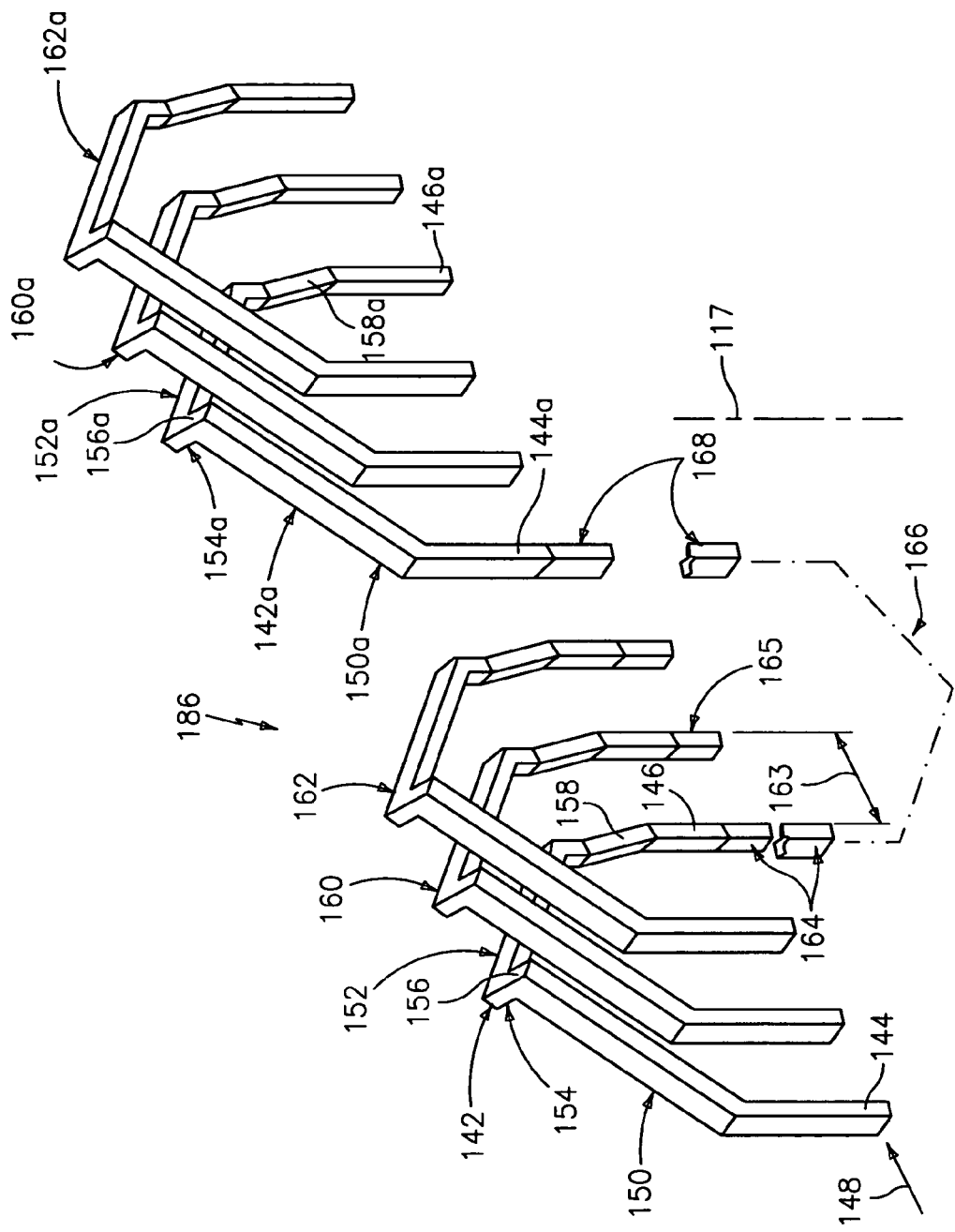
FIG. 10 depicts a fragmentary perspective view of a layer of end loop segments of a stator winding disclosed herein including the end loop segment of FIG. 5.

Referring now to FIG. 10, the end loop segment 142 of FIG. 9 is shown adjacent a plurality of substantially identical end loop segments, indicated generally at 160 and 162. The end loop segments 142, 160, and 162 form a portion of the layer 148 of the stator winding 186. The end loop segments 142, 160, and 162 are shown in a three-phase winding pattern but those skilled in the art will appreciate that the end loop segments 142, 160, and 162 may be formed in, for example, a six-phase winding pattern, or any other winding pattern advantageous for producing electricity or for generating torque, as in the case of an electric motor. The end loop segments 142, 160, and 162 are preferably each disposed at the first end 118 or 118' of the stator core 110 or 110'.

The portion 146 attaches to a first straight segment, shown schematically at 164, which extends through a one of the core slots 112 or 112' to the second end 120 or 120' of the stator core 110 or 110'. As the first straight segment 164 exits the second end 120 or 120', the first straight segment 164 is attached to an end of another end loop segment, shown schematically at 166, which is substantially identical to the end loop segments 142, 160, and 162. The end loop segment 166 is attached at another end to a second straight segment, shown schematically at 168. The second straight segment 168 extends upwardly through another one of the core slots 112 or 112' of the stator core 110 or 110' and attaches to a portion 144a of an end loop segment 142a, which is substantially identical to the end loop segments 142, 160, and 162. The end loop segments 142, 166 and 142a are considered three consecutive end loop segments because end loop segments 142 and 166 are connected to the same straight segment 164 and end loop segments 166 and 142a are connected to the same straight loop segment 168. The straight segments 164 and 168 are considered consecutive straight segments because straight segment 164 is connected to end loop segment 166, which is also connected to straight segment 168. Similarly, a portion 146a of the end loop segment 142a connects to another straight segment, discussed in more detail below. The pattern of connecting end loop segments 142, 166, and 142a and straight segments, such as the straight segments 164 and 168, as outlined above, continues throughout one substantial pass about the circumference 114 of the stator core 110 or 110' to form a first layer, such as the layer 148, of a single phase of the stator winding 186.

The end loop segment 142a is shown adjacent a plurality of substantially identical end loop segments, indicated generally at 160a and 162a. The end loop segments 142a, 160a, and 162a are each connected to a corresponding plurality of straight segments, discussed in more detail below, such as the straight segments 164 and 168, which are each disposed in a respective core slot 112 or 112' of the stator core 110 or 110'. The straight segments are attached to a plurality of end loop segments, discussed in more detail below, that are substantially identical to the end loop segments 160, 160a, 162, 162a, and 166. The end loop segments 160, 160a, 162, and 162a, when attached to the straight segments and end loop segments, each form a respective continuous first layer of the phase of the complete stator winding 168 that is wound about the circumference 114 of the stator core 110 or 110'.

Preferably, each of the straight segments 164 and 168 and each of the end loop segment portions 142, 142a, 160, 160a, 162, 162a, and 166 are formed from a rectangular wire and have a cross-sectional shape having a substantially equal area, however, other shapes could also be employed such as round or square. For those skilled in the art, it is known that typical rectangular or square shaped conductors may include radii on the corners intermediate two adjacent edges.

Figure 11A:
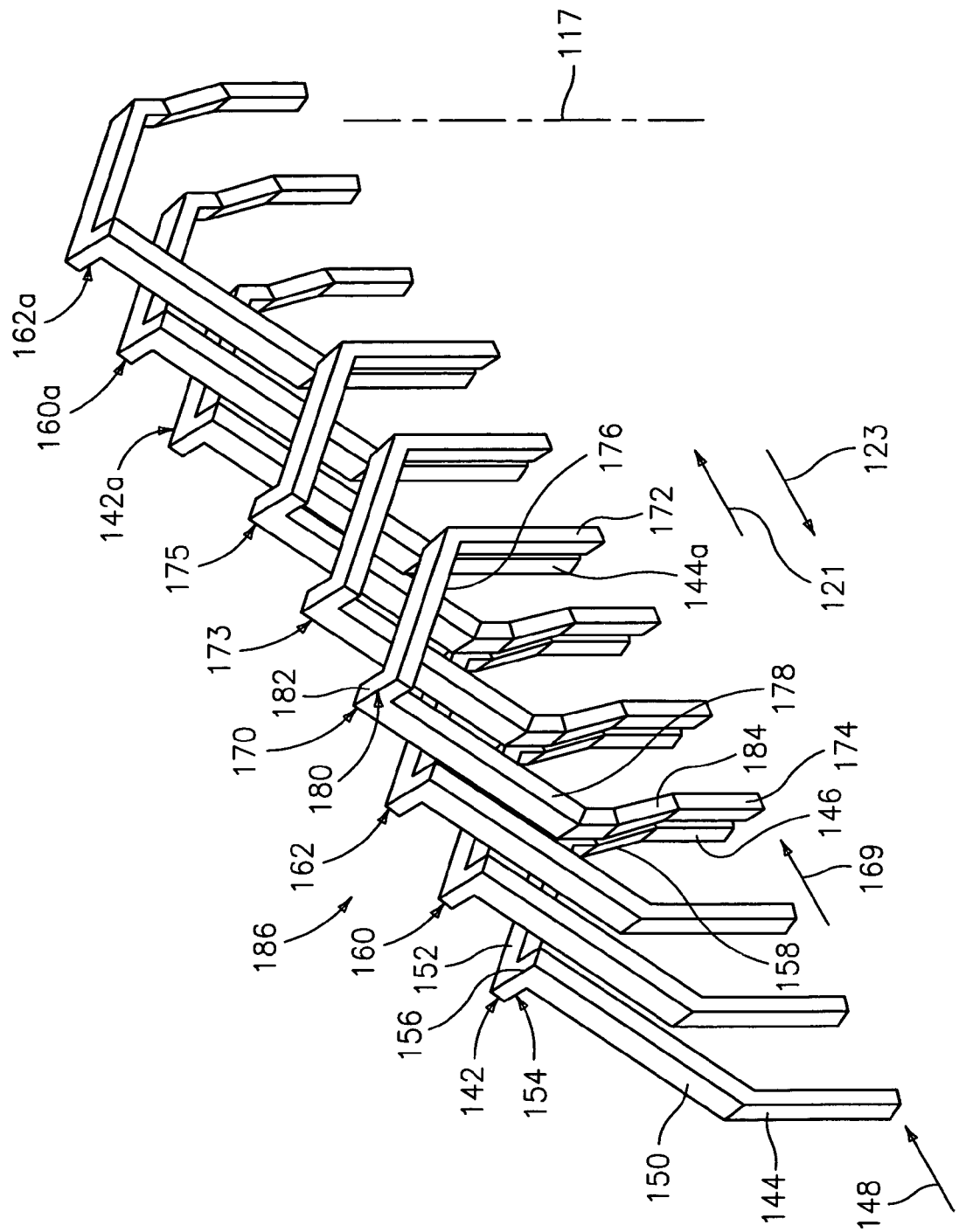
FIG. 11a depicts a perspective view of a plurality of layers of end loop segments of a stator winding disclosed herein including the layer of FIG. 6.
Figure 11B:
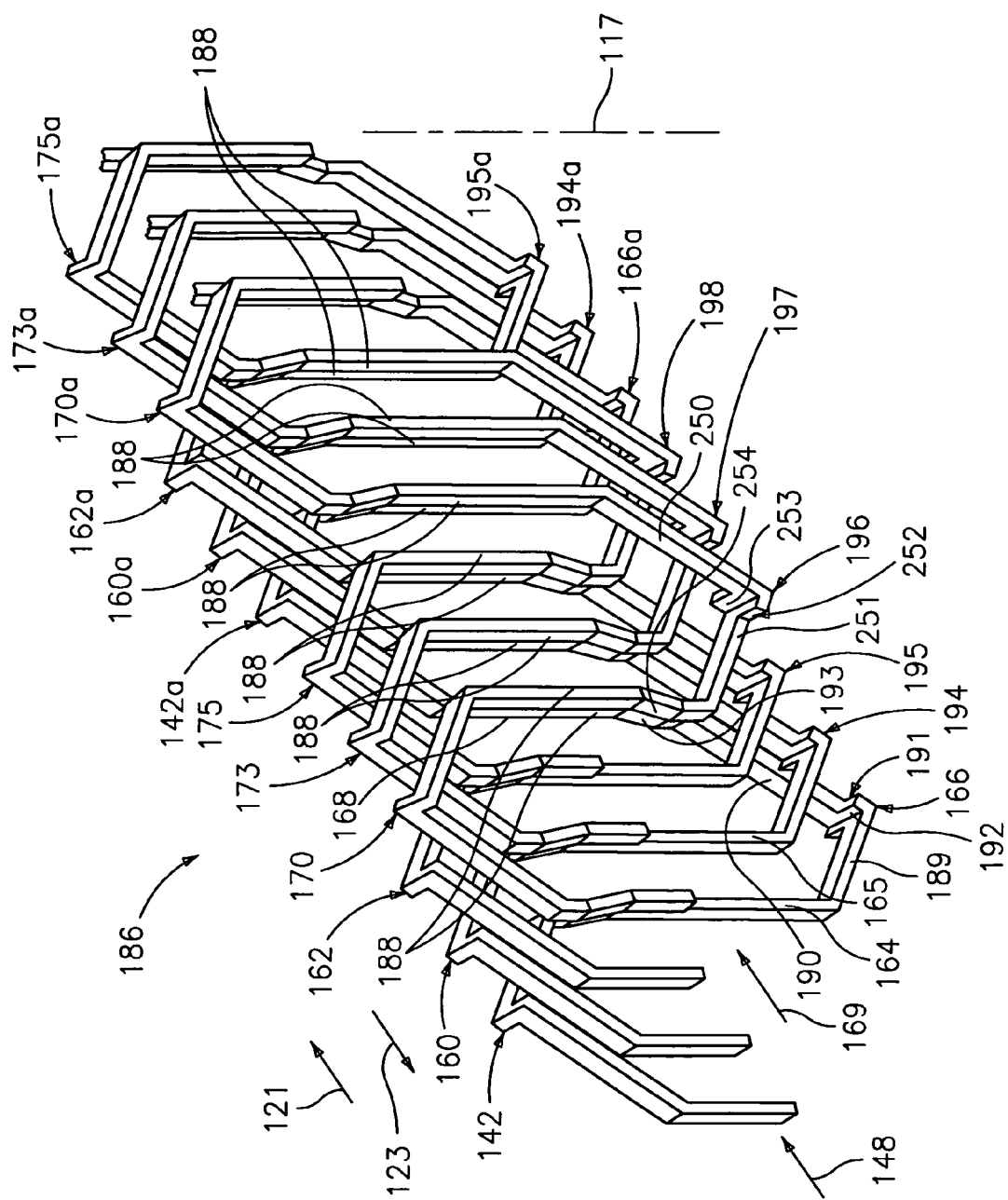
FIG. 11b depicts a perspective view of a plurality of layers of end loop segments of a stator winding shown in FIG. 11a with a plurality of straight segments and end loop segments disclosed herein.

Referring now to FIGS. 11a and 11b, the first layer 148 of the end loop segments 142, 142a, 160, 160a, 162, 162a of FIG. 10, is shown with a second layer of end loop segments indicated generally at 169. The layer 169 is located radially inward of the layer 148 at a predetermined radial distance from the layer 148. The second layer 169 includes a plurality of end loop segments, indicated generally at 170, 173, and 175. The layers 148 and 169 together form a portion of the stator winding, indicated generally at 186. The conductor of the layer 169 including the end loop 170 is similar to the conductor of layer 148 including the end loop 142 except that it is inserted into the core slots, shifted by n slots, discussed in more detail below, and it has end loop segments, such as the end loop segment 170, that extend radially outwardly in the counterclockwise direction 123, which is opposite the end loop segments, such as the end loop segment 142, of the layer 148, which extend radially outwardly in the clockwise direction 121.

The end loop segment 170 includes a first sloped portion 176 and a second sloped portion 178 connected by an apex portion 180. The first sloped portion 176 is substantially co-radial with the layer 169, the first end portion 172 and the second end portion 174. The second sloped portion 178 is substantially non-co-radial with the layer 169, the first end portion 172 and the second end portion 174. The apex portion 180 includes a first radial extension portion 182. The first radial extension portion 182 extends from the first sloped portion 176 in the radially outward direction, which provides a radial outward adjustment for the end loop segment 170. A second sloping radial extension portion 184 connects the second sloped portion 178 and the second end portion 174. The second radial extension portion 184 extends from the second sloped portion 178 in the radially inward direction, which provides a radial inward adjustment for the end loop segment 170. As can best be seen in FIG. 11a, the non-co-radial portion 178 of end loop segment 170 extends radially outward where it becomes substantially co-radial with layer 148, the first end portion 144 and the second end portion 146, but because it is shifted by n slots, discussed in more detail below, it does not violate the space of the end loop segments of layer 148. This allows the end loop segments of the two layers, 148 and 169 to cascade together forming a two layer winding 186, which extends radially outward by one wire width beyond the layer 148 but does not extend radially inward beyond the innermost layer 169. For a winding with a plurality of layers, a third layer (not shown) which is substantially identical to the layer 148, would have non-co-radial portions that would extend radially outward and be substantially co-radial with the layer 169 and therefore cascade with the layer 169. For a pattern where the radial layers alternate between being substantially identical with layer 148 and then layer 169, a pattern develops where the winding only extends radially outward by one wire width for the outermost layer 148 but not radially inward of the innermost layer. This cascading effect allows a winding 186 with a plurality of layers to be inserted into a stator core, such as the stator core 110 or 110', that extend radially outwardly by one wire width while not extending radially inwardly. The end loop segments 173 and 175 are substantially identical to the end loop segment 170. The radial outward and inward adjustments for the layers 148 and 169 form a cascaded winding pattern shown in FIGS. 11a and 11b.

Referring now to FIG. 11b, the layer 148 and the layer 169 are shown with a plurality of straight segments 188, which are substantially identical to the straight segments 164, 165, and 168. The end loop segment 166 of FIG. 10 is shown having a first sloped portion 189 and a second sloped portion 190 connected by an apex portion 191. The first sloped portion 189 is substantially co-radial with the layer 148, and the straight segments 164 and 168. The second sloped portion 190 is substantially non-co-radial with the layer 148, and the straight segments 164 and 168. The apex portion 191 includes a first radial extension portion 192. The first radial extension portion 192 extends from the first sloped portion 189 in the radially outward direction, which provides a radial outward adjustment for the end loop segment 166. A second sloping radial extension portion 193 connects the second sloped portion 190 and the straight segment 168. The second radial extension portion 193 extends from the second sloped portion 190 in the radially inward direction, which provides a radial inward adjustment for the end loop segment 166. The end loop segments 194 and 195 are substantially identical to the end loop segment 166.

Similarly, an end loop segment 196 of the layer 169 is shown adjacent the end loop segment 195 of the layer 148. The end loop segment 196 includes a first sloped portion 250 and a second sloped portion 251 connected by an apex portion 252. The first sloped portion 250 is substantially co-radial with the layer 169, and the straight segments 188 of the layer 169. The second sloped portion 251 is substantially non-co-radial with the layer 169, and the straight segments 188. The apex portion 252 includes a first radial extension portion 253. The first radial extension portion 253 extends from the first sloped portion 250 in the radially outward direction, which provides a radial outward adjustment for the end loop segment 196. A second sloping radial extension portion 254 connects the second sloped portion 251 and the straight segment 188. The second radial extension portion 254 extends from the second sloped portion 251 in the radially inward direction, which provides a radial inward adjustment for the end loop segment 196. The end loop segment 197 and 198 are substantially identical to the end loop segment 196.

The straight segments 164, 165, 168, and 188 of each phase of the stator winding 186 are preferably disposed in respective core slots 112 or 112' at an equal pitch around the circumference 114 of the stator core 110 or 110'. Specifically, a straight segment of a phase, such as the straight segment 164, is disposed in a respective core slot 112 or 112' adjacent a straight segment 165 of the adjacent phase. The respective straight segments 164 and 165 are spaced apart by a circumferential distance or pitch 163, best seen in FIG. 10. The circumferential pitch 163 is substantially equal to the circumferential distance between a pair of adjacent core slots 112 or 112' in the stator core 110 or 110'. Each of the straight segments and end loop segments of the phase including the straight segment 164 remain disposed adjacent the respective straight segments and end loop segments of the phase including the straight segment 164 at the same circumferential pitch 163 throughout the length of the stator winding 186 and throughout the circumference 114 of the stator core 110 or 110'.

The radial depth 125 of the straight portion of the core slots 112 or 112' is preferably sized to receive at least two layers, such as the layers 148 and 169 of the stator winding 186, therein. The angled surfaces 130 and 132 are preferably formed in the slots 112' at the axial ends 118' and 120' of the stator core 110', such that the slots 112' are long enough to accept the straight segments of the layers 148 and 169, along with the radial adjustments 158 and 193 which mate to the angled surfaces 130 and 132.

Figure 12:
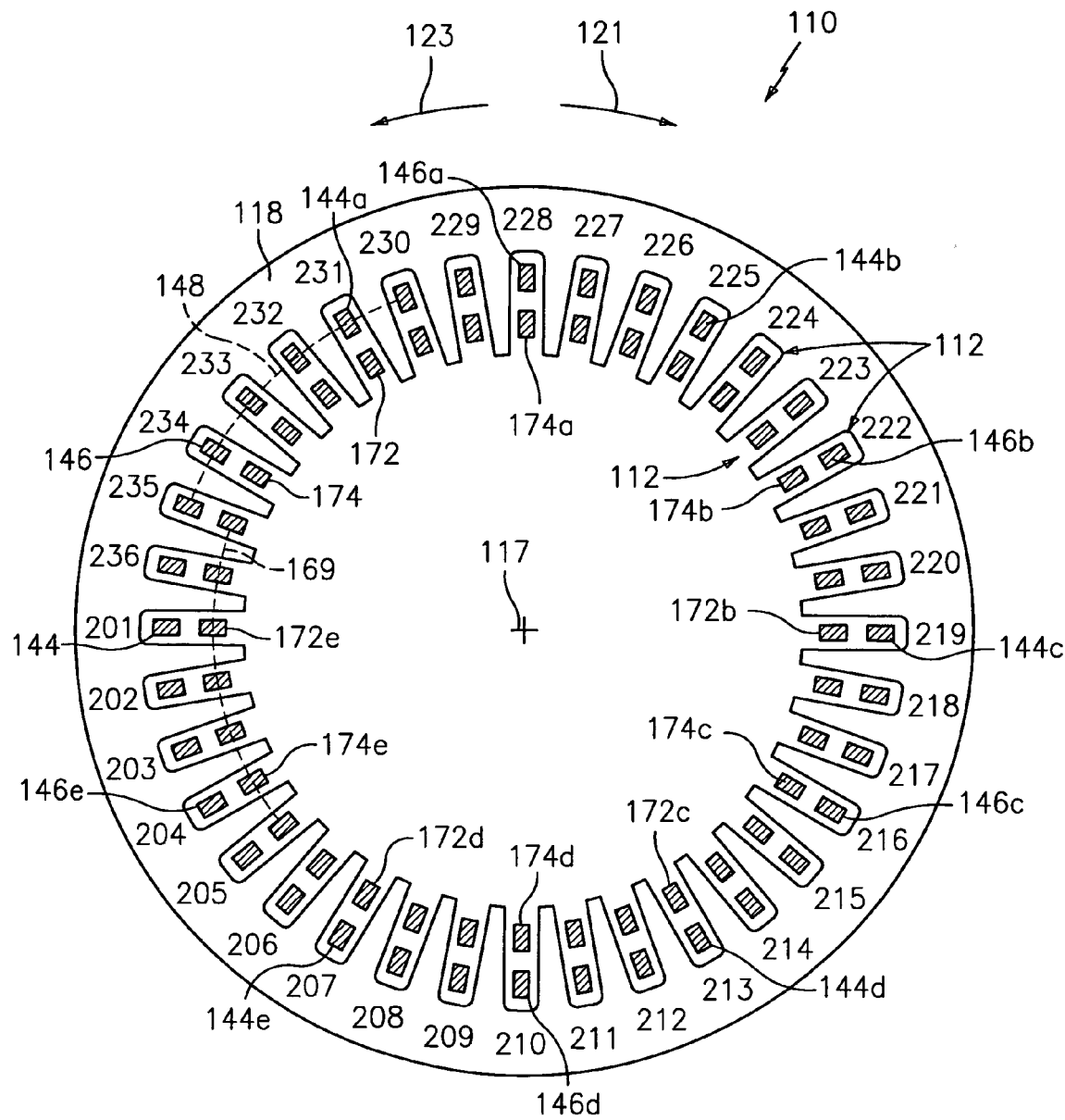
FIG. 12 depicts a schematic view of a stator core disclosed herein showing the locations of the various winding portions.

While the straight segments 188 are shown generally coplanar in FIGS. 11a and 11b for illustrative purposes, the straight segments 188 are preferably adapted to be received by a radially curved surface, such as the interior surface 114 of the stator core 110 and, therefore, are not coplanar (i.e., the circumferential layer 148 is flattened into a plane in FIG. 6) but are co-radial. The width of each of the straight segments 188, including any insulation, preferably fits closely to the width 113 of the core slots 112, including any insulation. There is shown in FIG. 12, a plan schematic view of the stator core 110. The stator core 110 includes a total of thirty-six core slots 112 numbered from 201 through 236 in increasing number in the circumferential counterclockwise direction 123. The stator winding 186 is adapted to be inserted in the core slots 112 to form a stator winding in accordance with the present invention as follows, where: n equals the number of phases in the stator winding 186. In FIG. 12, n=3.

When the stator winding 186 is formed, a first lead that connects to the portion 144 is inserted into the second axial end 120 of the core 110 in the slot number 201 and extends from the first axial end 118 of the core 110 in the slot number 201. The portion 146 is located in the slot number 234 and the end loop segment 142 connects the portions 144 and 146 at the first axial end 118. The portion 146 connects to the straight segment 164 in the slot number 234. The straight segment 164 extends through the slot 234 and exits the second axial end 120 of the core 110 of slot number 234, where it connects to the end loop segment 166. The end loop segment 166 is substantially identical to the end loop segment 142 except that it connects the straight segment 164 exiting from slot number 234 with the straight segment 168 exiting from the slot number 231 and is located on the second axial end 120 of the core 110.

The subsequent end loop segments alternate locations on the axial ends 118 and 120 of the core 110 and connect straight portions in every nth slots. The straight portions of the end loop segments are located as follows: a straight portion 146a is located in the slot number 228, a straight portion 144b is located in the slot number 225, a straight portion 146b is located in the slot number 222, a straight portion 144c is located in the slot number 219, a straight portion 146c is located in the slot number 216, a straight portion 144d is located in the slot number 213, a straight portion 146d is located in the slot number 210, a straight portion 144e is located in the slot number 207, and a straight portion 146e is located in the slot number 204. Each of the straight portions 144-144e and 146-146e, together with the associated end loop segments, form a continuous conductor of one phase of the stator winding 186. The straight portion 146e extends from the second end 120 of the stator core 110 as a second lead (not shown) and completes the layer 148 of the continuous phase. The first lead of the layer 148, therefore, extends from the slot number 201 and the second lead of the phase extends from the slot number 204. Each of the first and second leads is located on the second axial end 120 of the stator core 110.

The layer 169 of the phase lays radially inward of the layer 148 and is shifted by n slots, such that the respective end loop segments are on the opposite axial end 118 or 120 of the core 110 as the respective end loop segments of the first layer 148.

A first lead that connects to the portion 174 is inserted into the second axial end 120 of the core 110 in the slot number 234 and extends from the first axial end 118 of the core 110 in the slot number 234. The portion 172 is located in the slot number 231 and the end loop segment 170 connects the portions 172 and 174 at the first axial end 118. The portion 172 connects to a straight segment, such as the straight segment 188, in the slot number 231. The straight segment 188 extends through the slot number 231 and exits the second axial end 120 of the core 110 of the slot number 231, where it connects to an end loop segment, such as the end loop segment 196 of FIG. 11b, that is substantially identical to the end loop segment 170 except that it connects the straight segments exiting from slot number 231 with another straight segment 188 exiting from the slot number 228 and is located on the second axial end 120 of the core 110.

Similar to the layer 148, the subsequent end loop segments alternate locations on the axial ends 118 and 120 of the core 110 and connect straight portions in every nth slots. The straight portions of the end loop segments are located as follows: a straight portion 174a is located in the slot number 228, a straight portion 172a is located in the slot number 225, a straight portion 174b is located in the slot number 222, a straight portion 172b is located in the slot number 219, a straight portion 174c is located in the slot number 216, a straight portion 172c is located in the slot number 213, a straight portion 174d is located in the slot number 210, a straight portion 172d is located in the slot number 207, a straight portion 174e is located in the slot number 204, and a straight portion 172e is located in the slot number 201. Each of the straight portions 172-172e and 174-174e, together with the associated end loop segments, form a continuous phase of the stator winding 186. The straight portion 172e extends from the second end 120 of the stator core 110 as a second lead (not shown) and completes the layer 169 of the continuous phase. The first lead of the layer 169, therefore, extends from the slot number 234 and the second lead of the phase extends from the slot number 201. Each of the first and second leads is located on the second axial end 120 of the stator core 110. Preferably, the first and second leads of each layer 148 and 169 are connected to a rectifier (not shown), for supplying DC power to an automotive battery (not shown).

Each of the respective end loop segments 142, 160, 162, 166, 170, 173, 175, 194, 195, 196, 197, and 198 of the conductors of the stator winding 186 are cascaded, meaning that for each pass around the stator core 110, each of the conductors can be inserted into the stator core 110 in a sequential order. For example, the conductor including the end loop segment 142 is inserted for one substantial revolution about the circumference 114 of the stator core 110. After the conductor including the end loop segment 142 is inserted, the conductor including the end loop segment 160 may be inserted for one substantial revolution about the circumference 114 of the stator core 110. This pattern is repeated for the conductor including the end loop segment 162. As seen in FIG. 11b, when the conductor are inserted in this manner, the entirety of each of the continuous conductors may be wound about the circumference 114 of the stator core 110 without interfering with any of the other conductors. Preferably, the conductors of the layers 148 and 169 are aligned in one radial row in each slot 112 or 112'.

The conductor including end loop segment 142 of layer 148, and the conductor including end loop segment 170 of layer 169, include straight segments which coexist in the same core slots, as can best be seen in FIG. 11a. Therefore, these two conductors are the conductors of one phase. Furthermore, because each conductor passes circumferentially once around the core, the phase of a winding with two layers 148 and 169, is comprised of two conductors, each passing once circumferentially around the core 110. Similarly, the two conductors including end loop segments 160 and 173 coexist as a second phase and the conductors including end loop segments 162 and 175 coexist as a third phase, best seen in FIG. 11a.

Alternatively, the layers 148 and 169 of one particular phase are formed from one single continuous conductor. The phase winds around the core 110, alternating end loop segments with straight segments in predetermined core slots 112, in one circumferential direction as the radially outer layer 148 of the winding 186 and then reverses direction and winds around the core in the opposite circumferential direction as the radially inner layer 169 of the winding 186. When the first straight portion 146e extends from the axial end 120 of the stator core 110, instead of extending from the stator core 110 as a second lead, it extends radially inwardly and connects to an end loop segment, which enters the slot number 201 in the radially inward layer 169 to connect to the straight portion 172e. This wind pattern creates a reversing end loop portion 255, best seen in FIG. 13.

Figure 13:
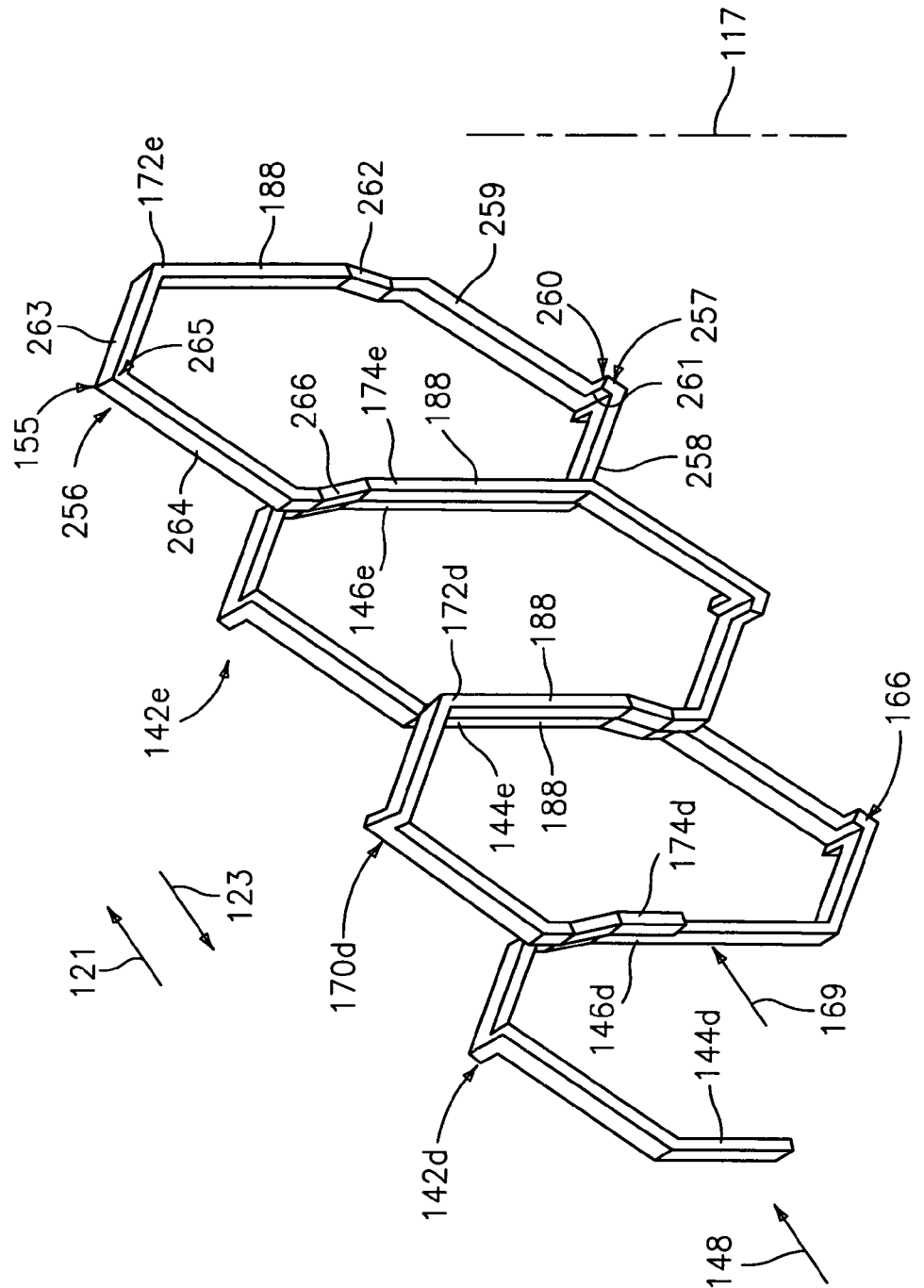
FIG. 13 depicts a perspective view of a reversing end loop portion of a stator winding disclosed herein.

Referring now to FIG. 13, the reversing end loop portion 255 is shown connecting the layer 148 and the layer 169 of one of the phases from FIGS. 11a and 11b and is shown adjacent an end loop segment 142d, which connects straight portions 144d and 146d, an end loop segment 142e, which connects straight portion 144e and 146e and an end loop segment 170d, which connects straight portions 172d and 174d. The reversing end loop portion 255 includes an upper reversing end loop segment 256 and a lower end loop segment 257 that are connected by respective straight portions 188. The lower end loop segment 257 includes a first sloped portion 258 and a second sloped portion 259 connected by an apex portion 260. The first sloped portion 258 is substantially co-radial with the layer 148. The second sloped portion 259 is substantially non-co-radial with the layer 148. The apex portion 260 includes a first radial extension portion 261. The first radial extension portion 261 extends from the first sloped portion 258 in the radially outward direction, which provides a radial outward adjustment for the lower end loop segment 257. A second sloping radial extension portion 262 connects the second sloped portion 259 and the straight segment 188. The second radial extension portion 262 extends from the second sloped portion 259 in the radially inward direction, which provides a radial inward adjustment for the lower end loop segment 257. The lower end loop segment 257, therefore, is substantially identical to the end loop segment 166.

The upper reversing end loop segment 256 includes a first sloped portion 263 and a second sloped portion 264 connected by an apex portion 265. The first sloped portion 263 and the second sloped portion 264 are substantially co-radial with the layer 148. The apex portion 265 is a straight connection between the first sloped portion 263 and the second sloped portion 264 and does not include a radial adjustment. A radial extension portion 166 connects the second sloped side 264 to the straight portion 174e.

In the stator core 110 of FIG. 5, the radial adjustments, such as the radial extension portions 158, 184, 262, and 266 are located exterior of the stator core slots 112 and adjacent a respective upper and lower surface of the first axial end 118 and the second axial end 120 of the stator core 110. Alternatively, the stator winding 186 is installed in the stator core 110' and the radial extension portions 158, 184, 262, and 266, are located in the interior of the stator core 110' in the core slots 112' adjacent the angled surface 130 of the first axial end 118' and the angled 132 of the second axial end 120' of the stator core 110'.

The end loop segments 142, 160, and 162 of the phases are substantially identical, which advantageously allows each of the phases to be processed from the same tooling. Similarly, the end loop segments 170, 173, and 175 are substantially identical, which advantageously allows each of the phases to be processed from the same tooling.

While the stator winding 186 has been shown and described as a three phase stator winding, those skilled in the art, however, will appreciate that the stator winding 186 could be formed as a six phase winding or any other pattern advantageous for producing electrical power or for generating torque, as in the case of an electric motor.

Although the stator winding 186 has been shown as having two layers 148 and 169 and therefore two conductors in each slot, it is often desirable to have a stator winding with more layers, such as four, and more conductors in each slot. This can be achieved by installing a plurality of layers substantially identical to layer 148 and layer 169 and radially alternating the windings substantially identical to layer 148 with windings substantially identical with layer 169, resulting in a plurality of layers and a plurality of conductors in each slot.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims.

What is claimed is:

1. A brushless vehicle alternator, comprising:
   a housing;
   a stationary shaft disposed at the housing, the stationary shaft having a first end portion that extends to a second end portion through an intermediate portion, the intermediate portion having a substantially constant diameter;
   a stationary field coil disposed at the intermediate portion of the stationary shaft, the stationary coil being radially proud of magnetically active portions of the shaft;
   a first bearing positioned at the first end of the shaft;
   a second bearing positioned at a second end of the shaft, the intermediate portion extending from the first bearing to the second bearing;
   a pole segment rotatable relative to the housing, the pole segment extending across in a spaced relationship the intermediate portion so as to define a stator air gap;
   a stator surrounding the pole segment, the stator including a core having a plurality of core slots in a surface thereof, the core slots extending between a first end and a second end of the stator core; and
   a stator winding including a plurality of phases, each of the phases having at least one conductor having a plurality of substantially straight segments disposed in the core slots, the straight segments alternately connected at the first and second ends of the stator core by a plurality of end loop segments, wherein a section of at least one of the conductors including three consecutive end loop segments and two straight segments, is formed from a single continuous conductor, and one of the core slots houses a plurality of the straight segments arranged in at least one radial row.

2. The brushless electric machine of claim 1 wherein the shaft is press-fitted to at least one half of the housing.

3. The brushless vehicle alternator of claim 1 further comprising a pulley integral with the pole segment.

4. The brushless vehicle alternator of claim 1 wherein the housing further comprises a plurality of cooling slots.

5. The brushless vehicle alternator of claim 1 wherein at least one of the conductors includes a section having three consecutive straight segments, wherein each of the three consecutive straight segments are disposed in the same radial position.

6. The brushless vehicle alternator of claim 1 wherein at least one of the core slots houses the straight segments housed in only one radial row.

7. A brushless electric machine, comprising:
   a housing;
   a stationary shaft disposed at the housing, the stationary shaft having a first end portion that extends to a second end portion through an intermediate portion, the intermediate portion having a substantially constant diameter;
   a stationary field coil disposed at the intermediate portion of the stationary shaft, the stationary coil being radially proud of magnetically active portions of the shaft;
   a first bearing positioned at the first end of the shaft;
   a second bearing positioned at a second end of the shaft, the intermediate portion extending from the first bearing to the second bearing;
   a pole segment disposed at the housing, the pole segment extending across in a spaced relationship the intermediate portion so as to define a stator air gap;
   a stator surrounding the pole segment, comprising:
   a generally cylindrically-shaped stator core having a plurality of circumferentially spaced and axially-extending core slots in a surface thereof, the core slots extending between a first end and a second end of the stator core;
   a stator winding including a plurality of phases, each of the phases having at least one conductor having a plurality of substantially straight segments disposed in the core slots, the straight segments alternately connected at the first and second ends of the stator core by a plurality of end loop segments; and
   a section of at least one of the conductors having three consecutive straight segments wherein each of the three consecutive straight segments are disposed in the same radial position.

8. The brushless electric machine of claim 7 wherein at least one of said end loop segments includes a first sloped portion substantially co-radial with said plurality of straight segments and a second sloped portion substantially non-co-radial with said plurality of straight segments, said first and second sloped portions connected by an apex portion thereof.

9. The brushless electric machine of claim 7 wherein at least one of said end loop segments includes a radial adjustment portion.

10. The brushless electric machine of claim 7 wherein the stator winding has at least two layers of conductors and at least one of said layers is shifted a predetermined number of slots from at least one of another said layers.

11. The brushless electric machine of claim 10 wherein said end loop segments of one of said layers extend radially outwardly in a counterclockwise direction on said first end of said stator core and said end loop segments of another one of said layers extend radially outwardly in a clockwise direction on said first end of said stator core.

* * * * *